United States Patent
Joisha (10) Patent No.: US 10,839,019 B2
(45) Date of Patent: Nov. 17, 2020

(54) SORT FUNCTION RACE

(71) Applicant: ENTIT Software LLC, Sunnyvale, CA (US)

(72) Inventor: Pramod G. Joisha, Saratoga, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 388 days.

(21) Appl. No.: 15/721,157

(22) Filed: Sep. 29, 2017

(65) Prior Publication Data

US 2019/0102483 A1 Apr. 4, 2019

(51) Int. Cl.
*G06F 16/903* (2019.01)
*G06F 9/30* (2018.01)

(52) U.S. Cl.
CPC .... *G06F 16/90348* (2019.01); *G06F 9/30018* (2013.01); *G06F 9/30065* (2013.01)

(58) Field of Classification Search
None
See application file for complete search history.

(56) References Cited

U.S. PATENT DOCUMENTS

| | | | | |
|---|---|---|---|---|
| 5,493,688 A * | 2/1996 | Weingard | ............... | B82Y 30/00 382/157 |
| 8,423,631 B1 * | 4/2013 | Mower | ............... | H04L 12/6418 709/223 |
| 8,938,773 B2 * | 1/2015 | Hubbard | ............... | H04L 51/12 713/151 |
| 9,557,975 B2 | 1/2017 | Angerer | | |
| 2004/0133526 A1 * | 7/2004 | Shmueli | ............... | G06Q 30/06 705/80 |
| 2007/0094313 A1 * | 4/2007 | Bolotin | ............... | G06F 16/322 |
| 2007/0255748 A1 * | 11/2007 | Ferragina | ............ | G06F 16/9027 |
| 2012/0131119 A1 * | 5/2012 | Oliver | ............... | G06F 16/24558 709/206 |
| 2012/0131139 A1 * | 5/2012 | Siripurapu | ............ | G06F 16/951 709/217 |
| 2014/0269684 A1 * | 9/2014 | Fortune | ................... | H04L 49/25 370/355 |
| 2018/0357096 A1 * | 12/2018 | McConnell | ............. | G06F 9/542 |
| 2019/0034467 A1 * | 1/2019 | Kwon | ................. | G06F 16/2228 |

FOREIGN PATENT DOCUMENTS

WO   WO2014042976   3/2014

OTHER PUBLICATIONS

AMD64 Technology, AMD64 Architecture, Programmer's Manual, vol. 4: 128-Bit and 256-Bit Media Instructions, Publication No. 26568, Revision 3.17, Date: May 2013 (897 pages).

(Continued)

*Primary Examiner* — Wilson Lee (57) ABSTRACT

In one example, a system for a sort function race can include a processor, and a memory resource storing instructions executable by the processor to generate a plurality of variant sort functions that utilize a variant of an input from a parent sort function, that perform the plurality of variant sort functions as a plurality of separate processes, identify a variant sort function from the plurality of variant sort functions that completes a function in a shortest period of time, and receive results from the identified variant sort function.

20 Claims, 7 Drawing Sheets

(56) References Cited

OTHER PUBLICATIONS

Cormen et al., Introduction to Algorithms, 3rd Edition, 2009 (1292 pages).
Kerrisk, Michael, The Linux Programming Interface, A Linux and UNIX® System Programming Handbook, 2010 (27 pages).
Lea, Doug, A Java Fork/Join Framework, 2000 (8 pages).
WG14/N1124 Committee Draft—May 6, 2005 ISO/IEC 9899:TC2 (550 pages).
Barnett, A.H. et al.; Validation of Neural Spike Sorting Algorithms Without Ground-truth Information; https://math.dartmouth.edu/~ahb/papers/valid_resub,pdf; Feb. 18, 2016, 24 p.
Bingmann, T. et al.; Engineering Parallel String Sorting; https://panthema.net/2013/parallel-string-sorting/1403.2056v1.pd; Mar. 9, 2014, 46 pages.
Ng, W, et al,; Merging String Sequences by Longest Common Prefixes; https://www.jstage.jst.go.jp/article/imt/3/2/3_2_236/_pdf; 2008, 10 pages.

\* cited by examiner

```
1   function void race(S, S₁, S₂, ..., Sₘ, oa,ia,n, w)
2     mx ← newInterprocessMutex()
3     id ← multiFork(m + 1)
4     if id = 0 // This is the parent.
5        cid ← wait()
6        copyByPageTableAdjustment(cid, oa, n, w)
7        shutdown(cid)
8     elseif id = 1
9        S
10    elseif id > 1
11       status ← S_{id - 1}
         // Child 2 executes S₁, Child 3 executes S₂, and so on.
12       if status = failure
13          die(failure)
14       endif
15    else // multiFork failed; so just execute S.
16       S
17    endif
18    if id ≥ 1 // Condition evaluates to true only in children.
19       lockInterprocessMutex(mx)
20       for i ← 1, m + 1
21          if i ≠ id
22             shutdown(i)
23          endif
24       endfor
25       unlockInterprocessMutex(mx)
26       notifyParent()
27       wait() // Child blocks indefinitely.
28    endif
```

```
51  function sort<α>(oa, ia, n, w, cmp<α>)
52    if n = 0
53      return success
54    endif
55    if n < 0 V w < α  // Either n, w, or α is invalid.
56      return failure
57    endif
58    tmp ← newArray<α>(n)
59    x ← getArrayElement(ia, 0, w)
60    setArrayElement<α>(tmp, 0, x)
61    t ← getArrayElement<α>(tmp, 0)
62    x ← bitXOR(x, t)
63    for j ← 1, n - 1
64      y ← getArrayElement(ia, j, w)
65      if bitXOR(x, y) ≥ 2^α
             // Upper w - α bits of x and y are not identical.
66        return failure
67      endif
68      setArrayElement<α>(tmp, j, y)
69    endfor
70    sort(tmp, tmp, n, α, cmp<α>)
71    for j ← 0, n - 1
72      z ← getArrayElement<α>(tmp, j)
73      x' ← bitOR(x, z)
74      setArrayElement(oa, j, w, x')
75    endfor
76    return success
```

Fig. 5

```
 81  function sort32(oa, ia, n, w, cmp32)
 82    if n = 0
 83      return success
 84    endif
 85    if n < 0 V w < 32  // Either n or w is invalid.
 86      return failure
 87    endif
 88    tmp ← newArray32(n)
 89    x ← getArrayElement(ia, 0, w)
 90    setArrayElement32(tmp, 0, x)
 91    t ← getArrayElement32(tmp, 0)
 92    x ← bitXOR(x, t)
 93    for j ← 1, n - 1
 94      y ← getArrayElement(ia, j, w)
 95      if bitXOR(x, y) ≥ $2^{32}$
            // Upper w - 32 bits of x and y are not identical.
 96        return failure
 97      endif
 98      setArrayElement32(tmp, j, y)
 99    endfor
100    sort(tmp, tmp, n, 32, cmp32)
101    for j ← 0, n - 1
102      z ← getArrayElement32(tmp, j)
103      x' ← bitOR(x, z)
104      setArrayElement(oa, j, w, x')
105    endfor
106    return success
```

Fig. 6

780 { 111  function void IPv6Sort(*oa, ia, n*)
      112    sort(*oa, ia, n,* 128, *IPv6Cmp*)

782 { 121  function void IPv6Sort$_1$(*oa, ia, n*)
      122    sort32(*oa, ia, n,* 128, *cmp32*)

784 { 131  function void IPv6Sort$_2$(*oa, ia, n*)
      132    sort64(*oa, ia, n,* 128, *cmp64*)

Fig. 7

SORT FUNCTION RACE

BACKGROUND

Devices can perform a plurality of functions. In some examples, computing devices can execute a sort function to put a plurality of elements in a particular order. For example, a computing device can execute a sort function to generate a numerical order or a lexicographical order. In some examples, sort functions can be utilized in connection with other functions. For example, a sort function can be utilized in connection with a search function or a merge function. In some examples, a function can include an algorithm to perform the functions.

DETAILED DESCRIPTION

A number of systems, devices, and methods for a sort function race are described herein. In some examples, a system for a sort function race can include a processor, and a memory resource storing instructions executable by the processor to generate a plurality of variant sort functions that utilize a variant of an input from a parent sort function and perform the plurality of variant sort functions as a plurality of separate processes. The systems, devices, and methods for a sort function race can be utilized to determine a fastest, or relatively faster, sort function for a particular sorting process. The examples described herein relate to sort functions. However, the description is not limited to sort functions, and can be utilized for other types of functions. As used herein, a sort function includes instructions to order a plurality of elements. For example, a sort function can include instructions that sort a plurality of words in a particular order.

The number of systems, devices, and methods for a sort function race can include utilizing a parent sort function and generating a plurality of child sort functions that are variants of the parent sort function. For example, the plurality of child sort functions can be generated by altering an input of the parent sort function for each of the plurality of child sort functions. In a specific example, the parent sort function can be a word sort function. In this example, a word size can be the input that is altered for each of the plurality of child sort functions that are generated. In some examples, the plurality of child sort functions can be utilized to race the parent sort function.

As used herein, a race can include an operation that determines a quantity of time that it takes for a function to complete or fail. In some examples, the race can utilize a plurality of corresponding computing processes for the plurality of child sort functions. In this way, a first process performing a first sort function will not affect a second process performing a second sort function. In contrast, a race utilizing a plurality of computing threads to perform the plurality of child sort functions can result in a first thread performing a first sort function affecting a performance of a second thread performing a second sort function. As used herein, a computing process includes executing instructions in memory spaces that are isolated from those of another computing process. By contrast, as used herein, a computing thread includes executing instructions in a shared memory space.

The sort function races described herein can be utilized to increase a speed or performance of an application. Thus, the sort function races described herein can increase a speed or performance of applications or hardware that utilize sort functions. For example, a sort function can be utilized by a word search application. In this example, a sort function race can be performed to increase a speed or performance of the word search application. In some examples, the sort function races described herein can be utilized to improve a plurality of computing applications and/or computing resources without having to individually generate a plurality of different sort functions or utilizing a plurality of different sort functions.

In a specific example, a sort function for a word search application can be a 128-bit sort function. In this example, a plurality of variant sort functions can be generated from the 128-bit sort function. In some examples, the plurality of variant sort functions can include a 32-bit variant sort function with the same internals as the 128-bit sort function. In these examples, the 32-bit sort function may perform the sort faster than the 128-bit sort function. In these examples, the 32-bit variant sort function can win the sort function race and the results from the 32-bit variant sort function can be received by the word search application faster than if only the 128-bit sort function was performed.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
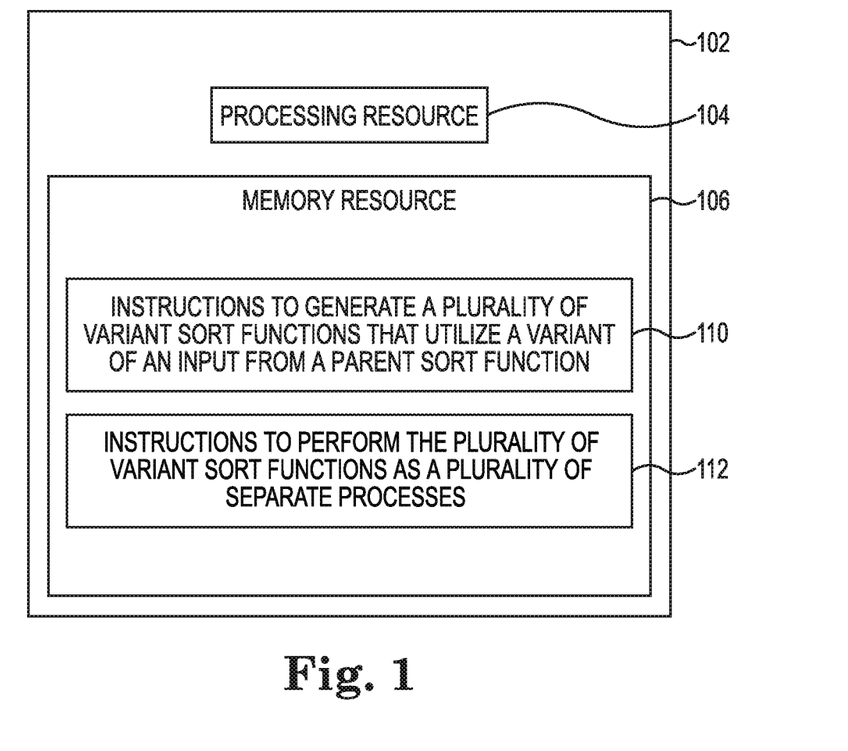
FIG. 1 illustrates an example of a computing device for a sort function race consistent with the present disclosure.

FIG. 1 illustrates an example of a computing device 102 for a sort function race consistent with the present disclosure. In some examples, the computing device 102 can include a memory resource 106 that can be utilized to store instructions 110, 112, which can be executed by a processing resource 104 to perform functions described herein.

A processing resource 104 may be a Central Processing Unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 110, 112. As an alternative, or in addition, to retrieving and executing instructions 110, 112, processing resource 104 may include an electronic circuit comprising a number of electronic components for performing the operations of the instructions 110, 112 in the memory resource 106. With respect to the executable instruction representations or boxes described and shown herein, it should be understood that part or all of the executable instructions 110, 112, and/or electronic circuits included within one box may be included in a different box shown in the figures or in a different box not shown.

Memory resource 106 may be any electronic, magnetic, optical, or other physical storage device that stores executable instructions 110, 112. Thus, memory resource 106 may be, for example, Random Access Memory (RAM), an Electrically-Erasable Programmable Read-Only Memory (EEPROM), a storage drive, an optical disc, and the like. The executable instructions 110, 112 may be stored on the memory resource 106. Memory resource 106 may be a portable, external or remote storage medium, for example, that allows the system to download the instructions 110, 112 from the portable/external/remote storage medium. In this situation, the executable instructions 110, 112 may be part of an "installation package". As described herein, memory resource 106 may be encoded with executable instructions 110, 112 for remote device.

In some examples, the memory resource 106 can include instructions to identify an input of a sort function. As described herein, the sort function can be a sort algorithm or other type of sort mechanism that can be utilized to arrange a plurality of elements into a particular order. For example, the sort function can be a word sort algorithm that sorts a plurality of words in a lexicographic order. In this example, the input of the sort function can be a word size and/or a word-size limitation.

For example, a parent sort function can utilize a particular word-size limitation or word-size range. In this example, the instructions can be utilized to identify the particular word-size limitation or word-size range of the parent sort function. As will be described herein, a plurality of child sort functions (e.g., variant sort functions) can be generated by altering the particular word-size limitation of the parent sort function. In this way, a plurality of child sort functions can be generated without knowledge of the internals of the parent sort function. As used herein, the internals of a sort function include instructions for performing the function.

In some examples, the memory resource 106 can include instructions 110 to generate a plurality of variant sort functions that utilize a variant of an input from a parent sort function. As described herein, the plurality of variant sort functions can be child sort functions generated utilizing a copy of a parent sort function. In some examples, the plurality of variant sort functions can be copies of the parent sort function with an alteration of the identified input of the parent sort function. That is, the plurality of variant sort functions can include the same internals as the parent sort function with a different input than the parent sort function.

In one example, the identified input can be a word size, as described herein. In this example, the word-size input of the parent sort function can be between 0 characters and 50 characters. In this example, the word-size input or range of characters can be altered for each of the plurality of variant sort functions. In this example, a first variant sort function of the plurality of variant sort functions can include a word-size input between 0 characters and 10 characters and a second sort variant function of the plurality of sort functions can include a word-size input between 0 characters and 15 characters. In some examples, the first variant sort function can be a relatively faster sort function, according to a function race, than the parent sort function. In these examples, the first variant sort function can be selected as a winning sort function when the first variant sort function performs the sort at a relatively faster rate than the second sort function.

In some examples, the memory resource 106 can include instructions 112 to perform the plurality of variant sort functions as a plurality of separate processes. As described herein, performing the sort function and the plurality of variant sort functions can include performing a race between the plurality of variant sort functions. As described herein, the race can be performed such that each of the plurality of variant sort functions are performed by separate processes. As described herein, the separate processes can each utilize a separate memory resource and not affect the performance of the other sort functions being performed during the function race. That is, a first process performing a first sort function does not impact a second process performing a second sort function.

In some examples, the memory resource 106 can include instructions to identify a function from the plurality of variant sort functions that completes a function in a shortest time period. As described herein, the plurality of variant sort functions can be executed for a function race to determine a quantity of time for the plurality of variant sort functions to be completed. In some examples, the variant sort function that completes the sort in the least quantity of time can be identified as a winning sort function and the results from the winning sort function can be utilized. For example, the memory resource 106 can include instructions to select the identified function or winning sort function, and to receive results from the identified function. In this example, the winning sort function can provide the results to the parent sort function via a copyByPageTableAdjustment, as described further herein.

In some examples, the computing device 102 can automatically generate the plurality of variant sort functions when the sort function or parent sort function is to be utilized. For example, the memory resource 106 can include instructions to determine when the sort function is to be executed for a particular function (e.g., word search). In this example, the input can be identified for the sort function, and the plurality of variant sort functions can be generated, as described herein. By generating the plurality of variant sort functions without knowledge of the internals of the parent sort function, a function race can be performed for each utilization of the parent sort function without having to determine the internals, and having to only regenerate the complete parent sort function with a plurality of different alterations.

Figure 2:
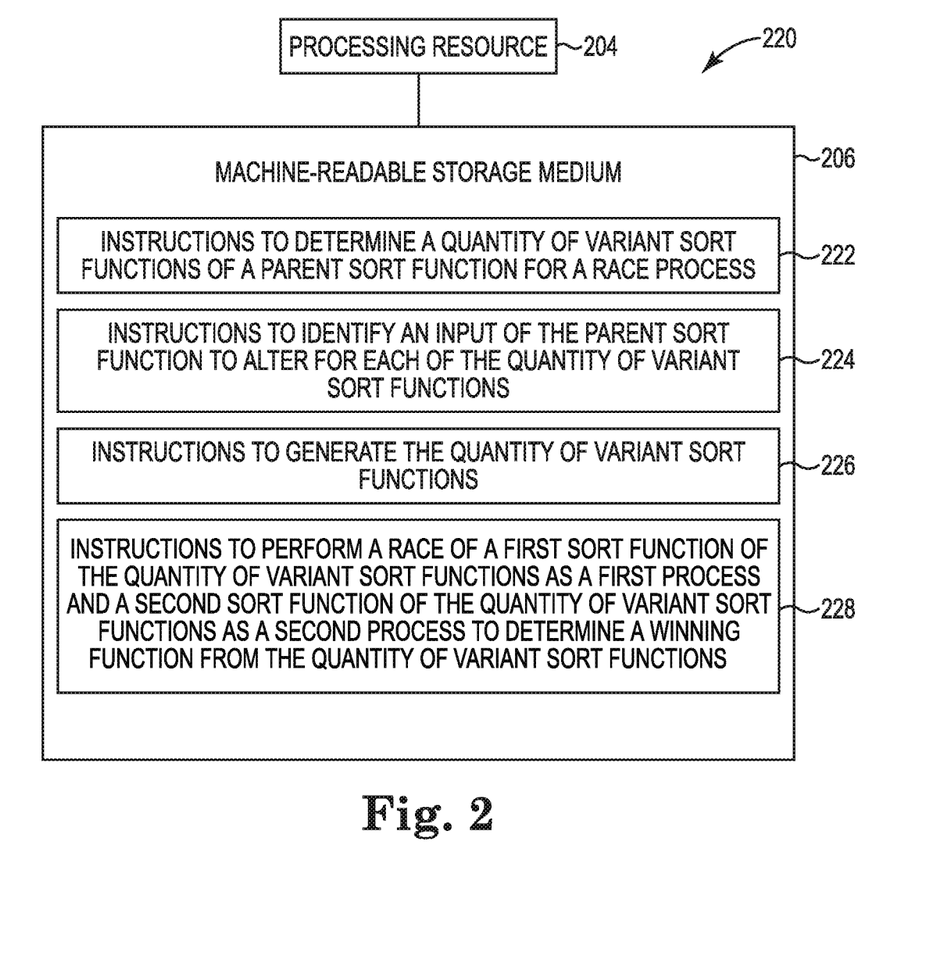
FIG. 2 illustrates an example of a system for a sort function race consistent with the present disclosure.

FIG. 2 illustrates an example of a system 220 for a sort function race consistent with the present disclosure. In some examples, the system 220 can include a machine-readable storage medium 206 that can be utilized to store instructions 222, 224, 226, 228, that can be executed by a processing resource 204 to perform functions described herein.

A processing resource 204 may be a CPU, microprocessor, and/or other hardware device suitable for retrieval and execution of instructions stored in a machine-readable storage medium 206. In some examples, the processing resource 204 can be coupled to the machine-readable storage medium 206 via a connection. The connection can be a physical or wireless communication connection. In the particular example shown in FIG. 2, processing resource 204 may receive, determine, and send instructions 222, 224, 226, 228. As an alternative, or in addition, to retrieving and executing instructions 222, 224, 226, 228, processing resource 204 may include an electronic circuit comprising a number of electronic components for performing the operations of the instructions 222, 224, 226, 228 in the machine-readable storage medium 206. With respect to the executable instruction representations or boxes described and shown herein, it should be understood that part or all of the executable instructions 222, 224, 226, 228, and/or electronic circuits included within one box may be included in a different box shown in the figures or in a different box not shown.

Machine-readable storage medium 206 may be any electronic, magnetic, optical, or other physical storage device that stores executable instructions 222, 224, 226, 228. Thus, machine-readable storage medium 206 may be, for example, RAM, an EEPROM, a storage drive, an optical disc, and the like. The executable instructions 222, 224, 226, 228 may be stored on the machine-readable storage medium 206. Machine-readable storage medium 206 may be a portable, external or remote storage medium, for example, that allows the system to download the instructions 222, 224, 226, 228 from the portable/external/remote storage medium. In this situation, the executable instructions 222, 224, 226, 228 may be part of an "installation package". As described herein, machine-readable storage medium 206 may be encoded with executable instructions 222, 224, 226, 228 for remote device configurations, as described herein.

In some examples, the machine-readable storage medium 206 can include instructions 222 to determine a quantity of variant sort functions of a parent sort function for a race process. In some examples, determining a quantity of variant sort functions can include determining a quantity of variant sort functions to generate for the race process. In some examples, the quantity of variant sort functions to generate for the race process can be based on a quantity of processes that are to be allocated for the race process. For example, the machine-readable storage medium 206 can include instructions to determine a quantity of variant sort functions to be generated based on available memory resources. In this example, the available memory resources can be utilized to determine a quantity of computing processes that can be utilized for the race process.

In some examples, the quantity of variant sort functions can be based on available memory resources since the race process can utilize a plurality of processes that each utilize a separate memory resource, described herein, instead of utilizing a plurality of threads that share the same memory resource. For example, the first process and the second process are separate processes. As used herein, a process is an isolated execution context. One or more threads comprise a process, and share in the execution context of the containing process. Thus, unlike processes, threads are not isolated from each other.

In some examples, the machine-readable storage medium 206 can include instructions 224 to identify an input of the parent sort function to alter for each of the quantity of variant sort functions. As described herein, the plurality of variant sort functions can each be a copy of the parent sort function with an alteration of the identified input of the parent sort function. In this way, the plurality of variant sort functions can be generated without knowledge of the internals of the parent sort function. In some examples, the input of the parent sort function can include a word size or other type of input that may change a speed of the parent sort function.

In some examples, the machine-readable storage medium 206 can include instructions 226 to generate the quantity of variant sort functions. In some examples, the instructions 226 can be used to mechanically generate the quantity of variant sort functions. In some examples, the parent sort function may not perform the sort function.

In some examples, the machine-readable storage medium 206 can include instructions 228 to perform a race of a first sort function of the quantity of variant sort functions as a first process, and a second sort function of the quantity of variant sort functions as a second process, to determine a winning function from the quantity of variant sort functions. In some examples, the instructions 228 can include instructions to provide a fork function, or fork call, to provide a plurality of processes for each of the plurality of variant sort functions. As used herein, instructions to fork the parent sort function include a procedure for creating a copy of the process via a system call.

As described herein, the race can be a race process to identify a quantity of time it takes for each of the parent sort function and the variant sort functions to complete the sorting process. In some examples, the parent sort function is performed by a first process that is separate from each of the variant sort functions.

In some examples, each of the variant sort functions can be performed by a corresponding computing process that is separate from the first process and separate from each of the other processes. In this way, each of the plurality of variant sort functions are performed by a separate and distinct process that utilizes a separate and distinct memory resource.

In some examples, a portion of the plurality of variant sort functions can fail during the sorting process. When it is determined that a variant sort function has failed during the sorting process, the variant sort function is ended and/or deleted. In these examples, the failed sort function does not affect the processes of the other sort functions of the race, since the failed sort function is performed as a separate computing process instead of a separate computing thread.

In some examples, the machine-readable storage medium 206 can include instructions to execute only the winning function, and to end and delete non-winning functions. For example, the sort results for the winning function can be utilized, and the sort results for the non-winning functions can be removed or deleted.

In some examples, the winning function can be a sort function that completes the sorting process in the least quantity of time. In some examples, the winning function can be one of the plurality of sort functions. In some examples, the winning function can be utilized as the sort function for a sort request. For example, a search engine can generate a sort request that utilizes the parent sort function. In this example, the system 220 can automatically generate the plurality of variant sort functions, as described herein, and perform the race process to determine a winning sort function. In this example, the results of the winning sort function can be provided to the search engine.

Figure 3:
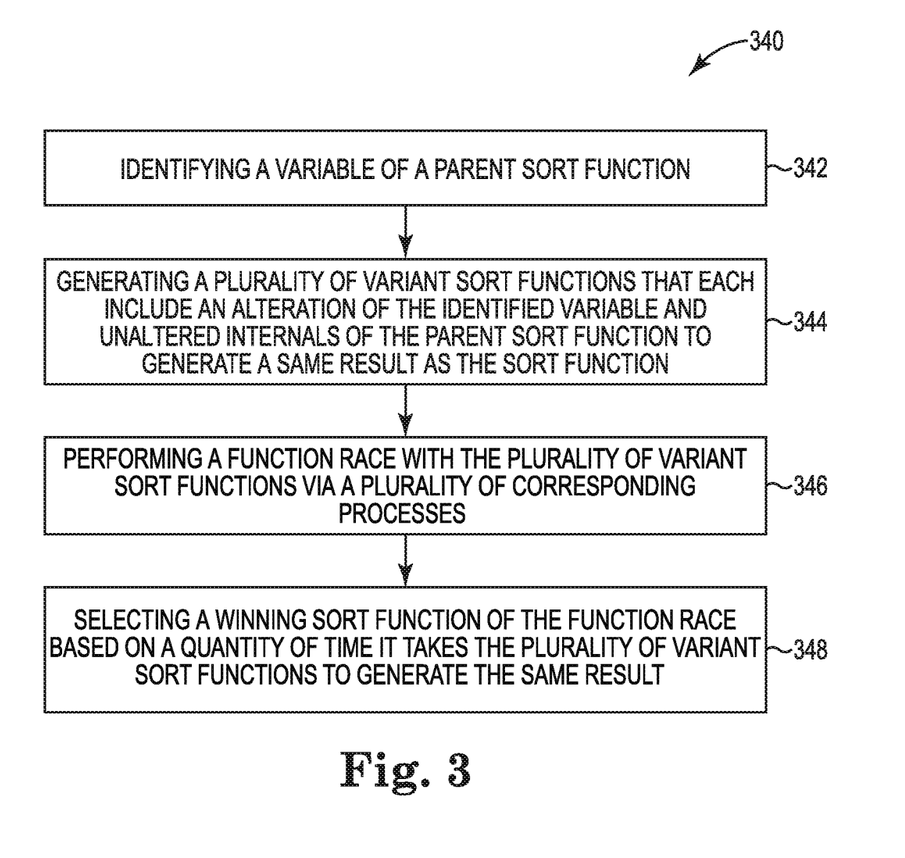
FIG. 3 illustrates an example of a method for a sort function race consistent with the present disclosure.

FIG. 3 illustrates an example of a method for a sort function race consistent with the present disclosure. In some examples, the method 340 can be performed by one or more computing devices. For example, the method 340 can be performed by a computing device 102 as referenced in FIG. 1, and/or a system 220 as referenced in FIG. 2, as described herein.

At block 342, the method 340 can include identifying a variable of a parent sort function. As described herein, identifying the variable of the parent sort function can include identifying an input that can be altered to change a speed of the parent sort function. For example, altering a word-size variable of the parent sort function can alter the speed of the parent sort function. In some examples, identifying the variable of the parent sort function can include identifying a variable of the parent sort function that does not change or alter the internals of the parent sort function. For example, the variable that is identified may not affect how the sort function performs the sort. In this example, the word-size input may not affect how the sort function performs the sort, but alters the inputs accepted by the sort function to sort. In some examples, the altered variable or input can increase the speed of the parent sort, since the acceptable word sizes to sort may be less for the variant sort function than for the parent sort function.

At block 344, the method 340 can include generating a plurality of variant sort functions that each include an alteration of the identified variable and unaltered internals of the parent sort function to generate a same result as the sort function. As described herein, the plurality of variant sort functions can include the same internals as the parent sort function and can perform the sort in substantially the same way as the parent sort function. Thus, altering the identified variable can alter acceptable inputs (e.g., word sizes) for each of the plurality of variant sort functions, which can alter a speed of the plurality of variant sort functions, but may not affect the process by which the parent sort function performs the sorting process. Thus, the parent sort function and the plurality of variant sort functions will generate the same set of results for the same sorting process, but may complete the sorting process in a different quantity of time.

In some examples, generating the plurality of variant sort functions can include utilizing an Application Programming Interface (API) specification of the parent sort function. For example, the API specification of the parent sort function can include a description or representation of the internals of the parent sort function. In this example, the API specification can be utilized to copy the parent sort function and alter the identified variable for each of the plurality of variant sort functions.

At block 346, the method 340 can include performing a function race with the plurality of variant sort functions via a plurality of corresponding processes. As described herein, the plurality of variant sort functions can each be performed on a separate and distinct computing process. In some examples, a fork function or fork system call (e.g., multiFork(m+1)) can be utilized to create new processes for each of the plurality of variant sort functions to perform the function race. As described herein, a computing process is different from a computing thread, in at least that the computing process utilizes a separate memory resource than other computing processes while a computing thread utilizes the same memory resource as other computing threads executing at a particular time. In some examples, the parent sort function and the plurality of variant sort functions can utilize the same internals to execute the sorting process, but may utilize different values for an input.

At block 348, the method 340 can include selecting a winning sort function in the function race based on a quantity of time it takes the plurality of variant sort functions to generate the same result. As described herein, selecting the winning sort function can include selecting a sort function from the plurality of variant sort functions that utilize a least amount of time to perform the sorting process. In some examples, the parent sort function does not sort. For example, processes created by multiFork can be single-threaded. In this example, if the parent sort function were to perform either the sort or an adaptation of the sort, there could be a problem if the parent sort function did not win the sort function race. For example, the parent sort function's threads would then have to be duplicated in the winning child. In some examples, a variant sort function can also become multithreaded, due to the internals of the variant sort function.

Figure 4:
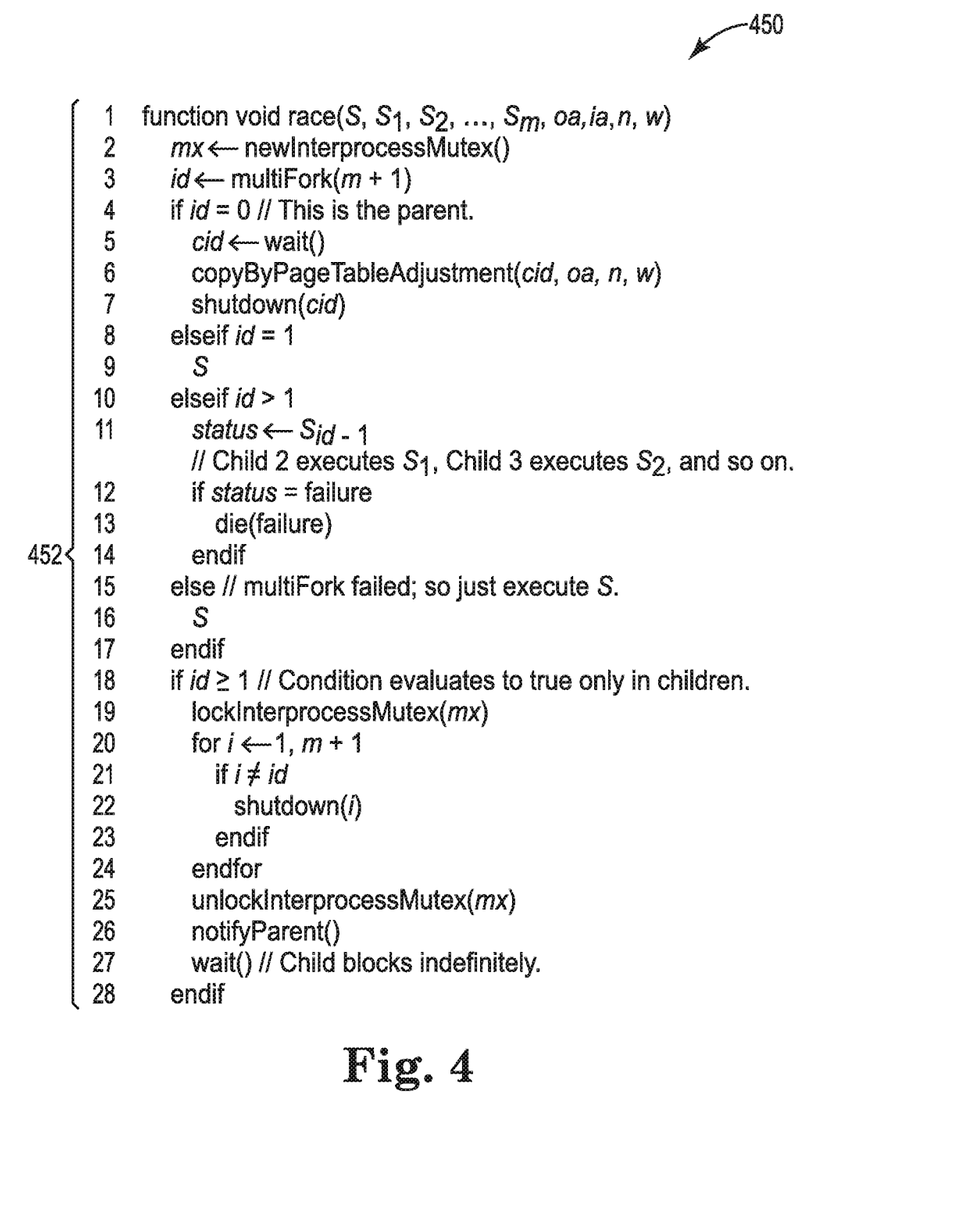
FIG. 4 illustrates an example race function for a sort function race consistent with the present disclosure.

FIG. 4 illustrates an example race function 450 for a sort function race consistent with the present disclosure. In some examples, the race function 450 can include a plurality of lines 452 that can provide a plurality of instructions to perform a sort function race, as described herein. FIG. 4 illustrates one example of a plurality of instructions to perform the sort function race, but examples of the present disclosure are not limited to this example.

Function 450 can include a sort function S and a plurality of variant sort functions (e.g., variant sort functions S1, S2, . . . , Sm). In some examples, the result of the sort function S can be in the n-element output array (oa), where each element is w bits wide. In some examples, the function 450 can include instructions to "multiFork" at line 3. As used herein, a multiFork can include an argument that specifies a quantity of child processes that the fork generates. For example, the multiFork can be utilized to generate a corresponding process for each of a plurality of variant sort functions, as described herein.

In some examples, function 450 can include instructions to generate m+1 variant sort functions and wait at line 5 to be notified of a winning variant sort function. In some examples, the function 450 can include instructions to execute the original sort as Child 1 on line 9. In some examples, the function 450 can include a return parameter that allows the variant sort functions to prematurely fail for any reason. For example, a child or variant sort function can die if it fails at line 13. In some examples, only variant sort functions can execute lines 19-27. In some examples, the interprocess mutex mx can ensure that a single child or variant sort function executes lines 20-24. In some examples, the single variant sort function can shut down the other plurality of variant sort functions, notify the parent sort function on line 26, and block indefinitely at line 27.

In some examples, the parent sort function can be notified of the winning variant sort function with the winning variant sort function's identifier in cid. In some examples, the parent sort function can copy over the cid's output array (oa) on line 6. In some examples, the copy operation on line 6 can be a relatively fast copy, since the multiFork can maintain the parent sort function's memory mappings in the variant sort functions. For example, the virtual address of an output array (oa) can be the same between the parent sort function and the variant sort functions. In this example, the physical address is changed through a Copy-On-Write (COW) operation. In some examples, this COW operation can allow the variant sort function's physical pages for the output array (oa) to be remapped to the parent sort function's output array (oa) by adjusting the page table. In COW, when a process is created, it can share its physical pages with the parent sort function. When the first write to a page happens, either in it or in its parent, the operating system (OS) can create a copy of the page. All writes to that page by that first writer, and all subsequent reads to that page by the first writer, are served by the created copy. For this to work, the virtual-to-physical page table for the writer can be updated by the OS. In some examples, the COW can be performed automatically by the OS, in a manner transparent to the user processes. In some examples, the only byte-copying of copyByPageTableAdjustment would be at places where the output array spans a page boundary.

In the context of transferring pages, copyByPageTableAdjustment could be a system call or a call into a user-space library. In some examples, an OS may not provide such a call. Thus, in some examples, an OS would have to be extended to provide it as a system call. Alternatively, in some versions of Linux®, copyByPageTableAdjustment could be implemented in user space by using the process_vm_readv and process_vm_writev system calls. These can enable data to be moved directly between process address spaces (e.g., the parent process and winning child process) without going through the kernel. For example, line 6 could be replaced with fastTransfer(cid, oa, n, w). In some examples, copyByPageTableAdjustment, process_vm_readv, and process_vm_writev can be ways in which fastTransfer is implemented.

Figure 5:
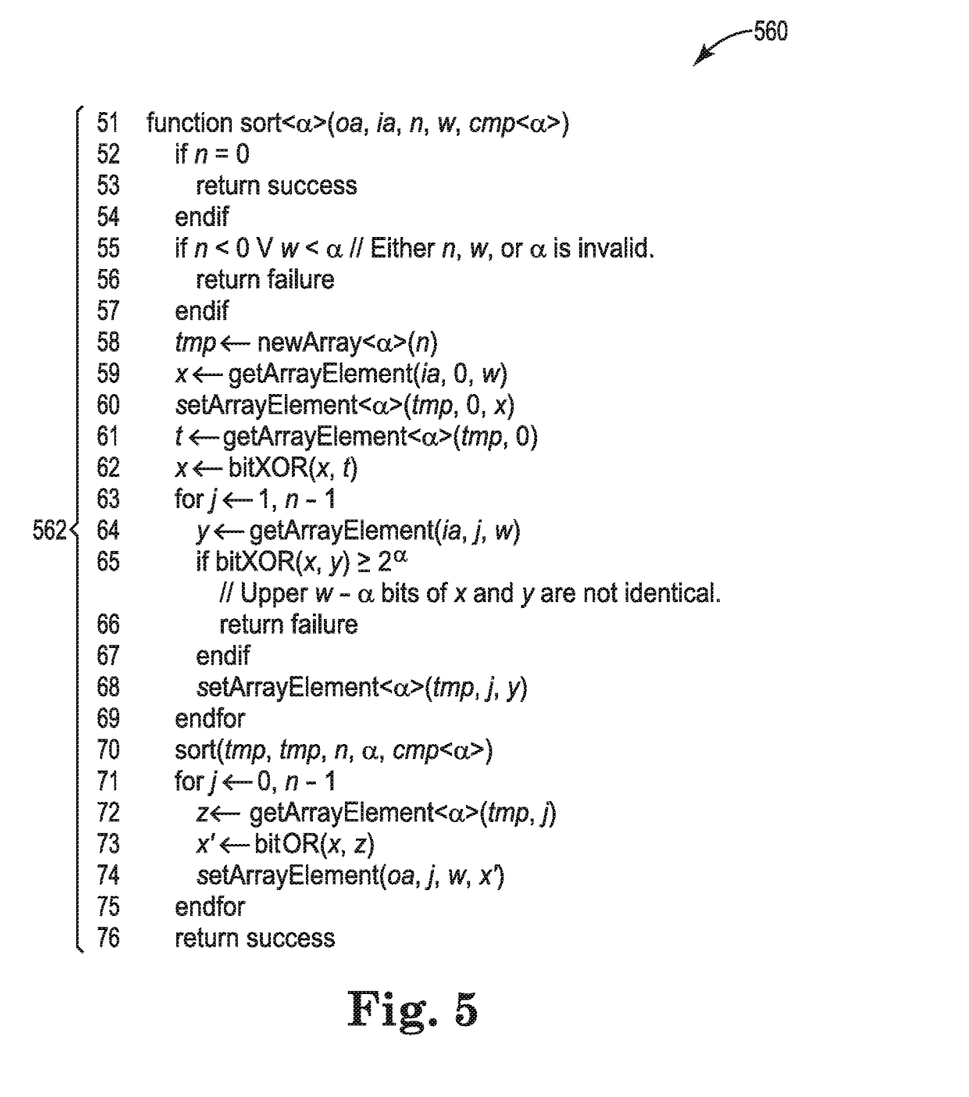
FIG. 5 illustrates an example variant sort function generator for a sort function race consistent with the present disclosure.

FIG. 5 illustrates an example variant sort function generator 560 for a sort function race consistent with the present disclosure. In some examples, the sort function generator 560 can be utilized to generate a plurality of variant sort functions. For example, the variant sort function generator 560 can generate a family of sort functions, where each member of the family sorts arrays with $\alpha$-bit wide elements. FIG. 5 illustrates an example of a plurality of instructions to generate a plurality of variant sort functions, but examples of the present disclosure are not limited to this example.

In some examples, the variant sort function generator 560 can include a plurality of lines 562. In some examples, each of the plurality of lines can correspond to a particular instruction. In some examples, the instruction at line 58 can allocate an array tmp of n $\alpha$-bit elements. In some examples, lines 59-62 can load a zeroth element of input array (ia) into x, store the lower $\alpha$ bits into the zeroth element of tmp, and then clear x's lower $\alpha$ bits.

In some examples, the loop on lines 63-69 can copy the lower $\alpha$ bits of the elements in an input array (ia) to tmp, checking that the upper w-$\alpha$ bits are all identical. The sort<$\alpha$> invocation returns failure on line 66 if any two elements in the input array (ia) differ in their upper w-$\alpha$ bits. Once the tmp array is populated, line 70 can sort by reusing the original sort with an $\alpha$-bit comparator cmp<$\alpha$>. In some examples, lines 71-75 can materialize an output array (oa) from the sorted tmp.

Figure 6:
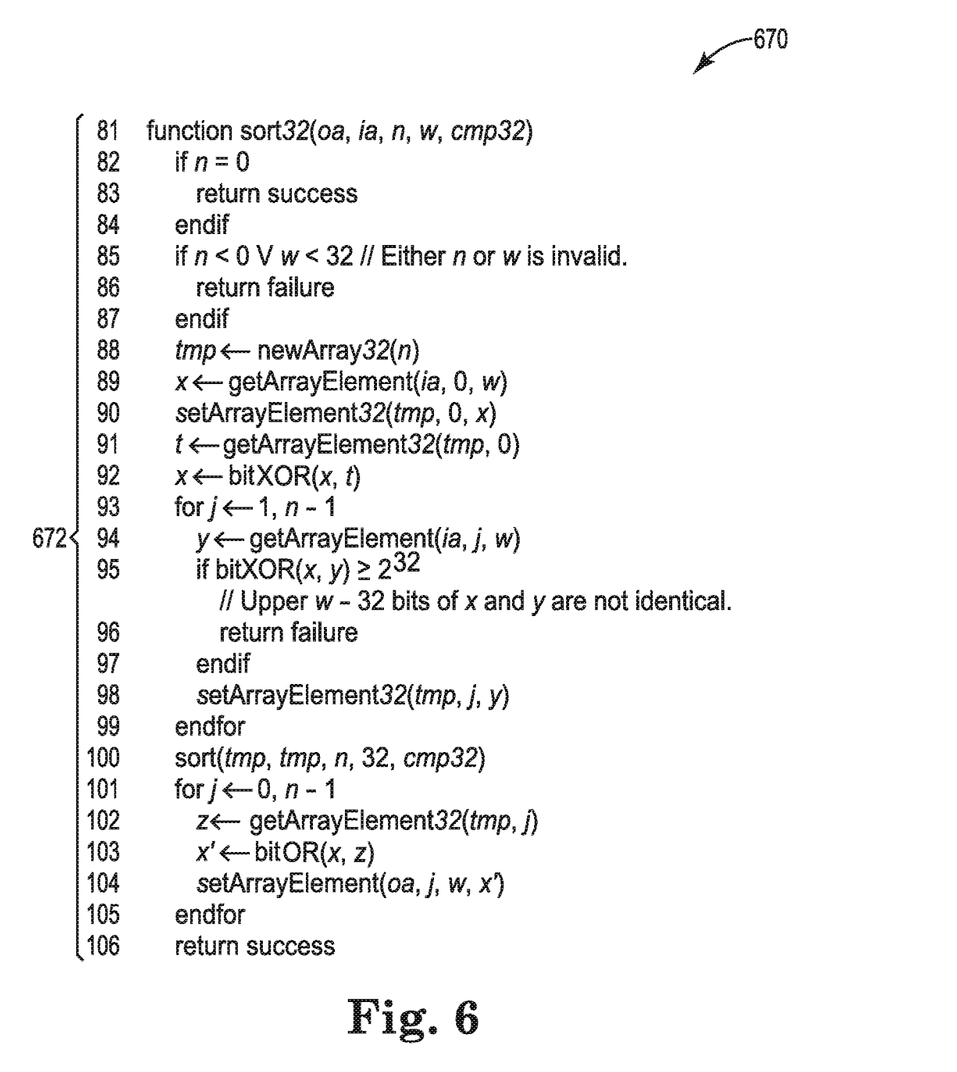
FIG. 6 illustrates an example variant sort function for a sort function race consistent with the present disclosure.

FIG. 6 illustrates an example variant sort function 670 for a sort function race consistent with the present disclosure. In some examples, the variant sort function 670 can be a sort32, obtained by instantiating $\alpha$ with 32 in FIG. 5.

In some examples, the variant sort function 670 can include a plurality of lines 672. As described herein, the plurality of lines 672 can include a corresponding instruction. In some examples, the variant sort function 670 can utilize a particular word size and/or a particular word-size limit, as described herein. In some examples, the variant sort function 670 can be obtained by replacing $\alpha$ with the value of 32 for the plurality of lines 562.

In some examples, a portion of the plurality of variant sort functions can fail during the sorting process. When it is determined that a variant sort function has failed during the sorting process, the variant sort function is ended and deleted. In these examples, the failed sort function does not affect the process of the other sort functions of the race since the failed sort function is performed as a separate computing process instead of as a separate computing thread.

In some examples, the winning function can be a sort function that completes the sorting process in the least quantity of time. In some examples, the winning function can be one of the plurality of sort functions. In some examples, the winning function can be utilized as the sort function for a sort request. For example, a search engine can generate a sort request that utilizes the parent sort function. In this example, the method can automatically generate the plurality of variant sort functions, as described herein, and perform the race process to determine a winning sort function. In this example, the results of the winning sort function can be provided to the search engine.

Figure 7:
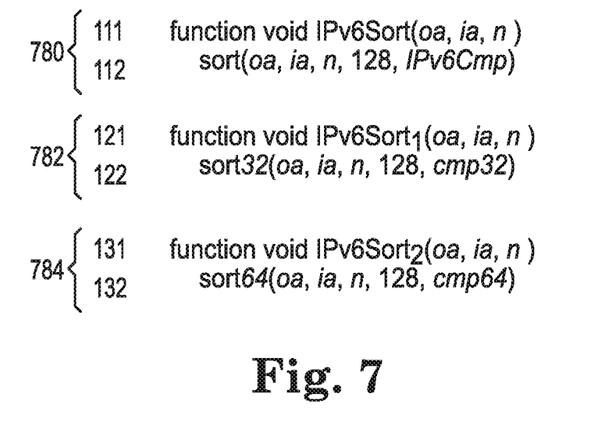
FIG. 7 illustrates an example race function for a sort function race consistent with the present disclosure.

FIG. 7 illustrates an example race function for a sort function race consistent with the present disclosure. In some examples, FIG. 7 can illustrate a plurality of lines 780 that can illustrate a function IPv6Sort that sorts IPv6 addresses. As used herein, an IPv6 address can include an Internet Protocol version 6 address that includes an address size of 128 bits. In some examples, the plurality of lines 780 can accomplish the sorting of IPv6 addresses by using a standard sort function and a 128-bit comparator IPv6Cmp.

In some examples, a 32-bit adaptation IPv6Sort$_1$ can be illustrated by the plurality of lines 782. In some examples, the 32-bit adaptation IPv6Sort$_1$ can be a variant sort function generated as described herein. In some examples, the IPv6Sort$_1$ can utilize sort32 and a 32-bit comparator cmp32. In some examples, instead of executing the original call IPv6Sort(oa, ia, n), the call race(IPv6Sort, IPv6Sort$_1$, oa, ia, n, 128) can be executed. In some examples, the plurality of lines 782 can be utilized to sort IPv4-mapped IPv6 addresses. As used herein, the IPv4 address can include an Internet Protocol version 4 address that includes an address of size 32 bits.

In some examples, the IPv4-mapped IPv6 address can include an 80-bit prefix of zeroes, followed by 16 ones, followed by a 32-bit IPv4 address. Thus, if is consists of only IPv4-mapped IPv6 addresses, the IPv6Sort$_1$ can be faster than the original IPv6Sort because the IPv6Sort$_1$ call would execute O(n lg n) 32-bit moves instead of O(n lg n) 128-bit moves. Under an assumption that n is larger than a threshold value, a four-fold improvement can be observed by the IPv6Sort$_1$ call compared to the IPv6Sort call.

In some examples, the plurality of lines 782 can correspond to a 64-bit adaptation. In some examples, an IPv6 Local Area Network (LAN) can form /64 IPv6 Classless Inter-Domain Routing (CIDR) blocks. In some examples, a 64-bit adaptation of IPv6Sort$_2$ can be generated, as illustrated in the plurality of lines 784. When the value of n is above a threshold, the call race(IPv6Sort, IPv6Sort$_1$, IPv6Sort$_2$, oa, ia, n, 128) can run approximately twice as fast as the original IPv6Sort function on addresses from a /64 IPv6 CIDR block, and approximately four times faster than the original IPv6Sort on addresses from a /96 IPv6 CIDR block.

The above specification, examples, and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A non-transitory machine-readable storage medium comprising machine-readable instructions that upon execution cause a computer to:
   determine a quantity of variant sort functions to be derived from a parent sort function for a race process;
   identify an input of the parent sort function to alter for each of the quantity of variant sort functions;
   generate the quantity of variant sort functions; and
   perform, as part of the race process, a race of a first sort function of the quantity of variant sort functions as a first process and a second sort function of the quantity of variant sort functions as a second process to identify a winning function of the quantity of variant sort functions, wherein the identifying of the winning function comprises determining which of the quantity of variant sort functions completes an operation in a shortest period of time.

2. The non-transitory machine-readable storage medium of claim 1, wherein the machine-readable instructions upon execution cause the computer to utilize results of the winning function as sort results.

3. The non-transitory machine-readable storage medium of claim 1, wherein a variant sort function of the quantity of variant sort functions fails during the race process.

4. The non-transitory machine-readable storage medium of claim 1, wherein the machine-readable instructions upon execution cause the computer to utilize results of the winning function, and to end and delete non-winning functions of the quantity of variant sort functions.

5. The non-transitory machine-readable storage medium of claim 1, wherein the machine-readable instructions upon execution cause the computer to generate the quantity of variant sort functions by utilizing internal instructions of the parent sort function and altering the identified input.

6. The non-transitory machine-readable storage medium of claim 1, wherein the input of the parent sort function comprises an Internet Protocol address comparator.

7. The non-transitory machine-readable storage medium of claim 1, wherein the first sort function utilizes a 32-bit Internet Protocol address comparator, and the second sort function utilizes a 64-bit Internet Protocol address comparator.

8. The non-transitory machine-readable storage medium of claim 1, wherein the performing of the race of the first sort function and of the second sort function comprises performing the first sort function and the second sort function as separate processes.

9. The non-transitory machine-readable storage medium of claim 1, wherein the machine-readable instructions upon execution cause the computer to disregard results from variant sort functions of the quantity of variant sort functions that performed the operation in a longer period of time than the winning function.

10. The non-transitory machine-readable storage medium of claim 1, wherein the first process does not impact the second process.

11. The non-transitory machine-readable storage medium of claim 1, wherein the input of the parent sort function is a word size.

12. The non-transitory machine-readable storage medium of claim 1, wherein the generating of the quantity of variant sort functions utilizes an application programming interface (API) specification of the parent sort function.

13. The non-transitory machine-readable storage medium of claim 1, wherein the first sort function and the second sort function produce a same sort result as part of the race process.

14. The non-transitory machine-readable storage medium of claim 13, wherein the machine-readable instructions upon execution cause the computer to:
  determine a respective period of time taken by each corresponding variant sort function of the quantity of variant sort functions in performing the operation; and
  compare the determined periods of time,
  wherein the identifying of the winning function is based on the comparing.

15. A system comprising:
  a processor; and
  a non-transitory storage medium storing instructions executable on the processor to:
    determine a quantity of variant sort functions to be derived from a parent sort function;
    identify an input of the parent sort function to alter for each of the quantity of variant sort functions;
    generate the quantity of variant sort functions; and
    perform a race of a first sort function of the quantity of variant sort functions as a first process and a second sort function of the quantity of variant sort functions as a second process to identify a winning function of the quantity of variant sort functions, wherein the identifying of the winning function comprises determining which of the quantity of variant sort functions completes an operation in a shortest period of time.

16. The system of claim 15, wherein the instructions are executable on the processor to disregard results from variant sort functions of the quantity of variant sort functions that performed the operation in a longer period of time than the winning function.

17. The system of claim 15, wherein the instructions are executable on the processor to generate the quantity of variant sort functions by utilizing internal instructions of the parent sort function and altering the identified input.

18. The system of claim 15, wherein the first sort function and the second sort function produce a same sort result as part of the race.

19. The system of claim 18, wherein the instructions are executable on the processor to:
  determine a respective period of time taken by each corresponding variant sort function of the quantity of variant sort functions in performing the operation; and
  compare the determined periods of time,
  wherein the identifying of the winning function is based on the comparing.

20. A system comprising:
  a processor; and
  a non-transitory storage medium storing instructions executable on the processor to:
    determine a quantity of variant sort functions to be derived from a parent sort function;
    identify an input of the parent sort function to alter for each of the quantity of variant sort functions;
    generate the quantity of variant sort functions by utilizing internal instructions of the parent sort function and altering the identified input; and
    perform a race of a first sort function of the quantity of variant sort functions as a first process and a second sort function of the quantity of variant sort functions as a second process to identify a winning function of the quantity of variant sort functions, wherein an input of the first sort function comprises an address of a first length, and an input of the second sort function comprises an address of a second length different from the first length.

* * * * *